United States Patent
Wang et al.

(10) Patent No.: US 7,174,542 B2
(45) Date of Patent: Feb. 6, 2007

(54) SYSTEM AND METHOD XLET AND APPLET MANAGER TESTING

(75) Inventors: Xiaozhong Wang, Santa Clara, CA (US); Stanislav Avzan, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 774 days.

(21) Appl. No.: 10/236,801

(22) Filed: Sep. 5, 2002

(65) Prior Publication Data

US 2003/0196189 A1    Oct. 16, 2003

Related U.S. Application Data

(60) Provisional application No. 60/372,248, filed on Apr. 12, 2002.

(51) Int. Cl.
*G06F 9/44* (2006.01)

(52) U.S. Cl. ..................... 717/124; 717/126
(58) Field of Classification Search ......... 717/124–135
See application file for complete search history.

(56) References Cited

U.S. PATENT DOCUMENTS

| 2002/0069263 A1* | 6/2002 | Sears et al. ............... 709/218 |
| 2002/0133807 A1* | 9/2002 | Sluiman ..................... 717/124 |
| 2002/0198868 A1* | 12/2002 | Kinzhalin et al. ............. 707/3 |
| 2003/0121003 A1* | 6/2003 | Soshalsky et al. .......... 715/513 |

OTHER PUBLICATIONS

Pawlan, Introduction to Digital TV Applications Programming, Feb. 2001.*

* cited by examiner

*Primary Examiner*—Kakali Chaki
*Assistant Examiner*—Insun Kang
(74) *Attorney, Agent, or Firm*—Martine Penilla & Gencarella, LLP

(57) ABSTRACT

An invention is provided for an application manager testing interface that provides a public API usable by testing software. The application manager testing interface allows testing software to issue commands to an application manager to test the life cycle and state management abilities of the application manager. A testing program capable of providing commands to test a life cycle of a dependent program controlled by an application manager is provided. In addition, an application manager testing interface is included that is in communication with the testing program and the application manager. The application manager testing interface is capable of receiving the commands from the testing program and providing the commands to the application manager. In this manner, the application manager can control the dependent program based on the commands. In one aspect, the testing program can be controlled by the application manager. For example, the application manager can be an Xlet manager and the testing program is an agent Xlet, or the application manager can be an applet manager and the testing program can be an agent applet.

20 Claims, 7 Drawing Sheets

SYSTEM AND METHOD XLET AND APPLET MANAGER TESTING

CROSS REFERENCE TO RELATED APPLICATIONS

This application claims the benefit of U.S. Provisional Patent Application having Ser. No. 60/372,248, filed on Apr. 12, 2002, entitled "Method for Implementing Xlet Manager Classes and Code for Executing the Same," which is hereby incorporated by reference.

BACKGROUND OF THE INVENTION

1. Field of the Invention

This invention relates generally to computer program testing, and more particularly to applet and xlet manager software compatibility testing.

2. Description of the Related Art

Java™, originally developed by Sun Microsystems, is an object-oriented, multithreaded, portable, platform-independent environment used to develop, test, and maintain software programs. As used hereafter, any reference to Java will be understood to contain the appropriate trademark reference owned by Sun Microsystems Inc. To assure platform-independence, Java implementations are often tested using methods that confirm consistency across multiple hardware platforms, operating systems, and other implementations of the same Java technology specification. This type of testing generally is referred to as compatibility testing.

FIG. 1 is an illustration showing a conventional Java based software environment 100. Java accomplishes platform independence using a Java virtual machine (JVM) 104, which resides above the native operating system (OS) 102. In addition, the Java based environment can include an application programming interface (API) 106 that provides additional functionality to Java applications 108 executing on the JVM 104.

Generally, the Java program 108 comprises machine-independent byte code, which is interpreted by the JVM 102 before being run on a native instruction set of the target processor. In addition, the API 106 can provide libraries of functions, which the Java application 108 can use to perform specific tasks. In the example of FIG. 1, the Java application 108 is essentially a "standalone" program, which can create what it needs to execute. That is, the Java application 108 generally does not need other applications to execute properly.

Because of its "standalone" nature, a testing program can easily perform compatibility testing on the Java API 106 by loading a test that calls Java API 106 into JVM and monitor the test's behavior. However, not all Java based programs are "standalone" applications. For example, Java programs have found extensive use on the World Wide Web, which is the Internet's multimedia information retrieval system. These programs include smaller programs, known as applets, that run in a Java enabled Web browser or applet viewer. Such Java applets require an applet manager, such as the Java enabled browser, to execute properly.

FIG. 2A is a block diagram showing a conventional Java applet based software environment 200. Similar to FIG. 1, the conventional applet based software environment 200 includes an OS layer 102, on which a JVM 104 and API 106 are executed. However, the applet based software environment 200 also includes an applet manager 110, which in the example of FIG. 2A is a Java enabled browser, that provides an environment for applet programs 112 to execute. In operation, the applet manager 110 controls the state and execution of the applets 112. That is, the applet manager 110 determines when to load, start, and stop each applet 112. For example, a particular input applet 112 may be designed to create and open a small window that allows a user to input data. In this case, the applet manager 110 (browser) may load the input applet 112 in response to a user making a particular selection on the browser 110 to enter data.

Similar to applets, Java based software for small devices often require a separate software manager to execute properly. Generally, Java software for small devices is developed using Java 2 Micro Edition (J2ME), which is an edition of Java 2 for small devices such as PDAs and consumer appliances. One type of program often used in J2ME is the Xlet, which is a program similar to an applet, which executes within an Xlet manager.

FIG. 2B is a block diagram showing a conventional J2ME Xlet based software environment 250. Similar to FIG. 2A, the conventional Xlet based software environment 250 includes an OS layer 102', on which a JVM 104' and API 106' are executed. However, the Xlet based software environment 250 includes an Xlet manager 254 that provides an environment for Xlet programs 256 to execute. As with the applet manager of FIG. 2A, the Xlet manager 254 controls the state and execution of the Xlets 256. Hence, the Xlet manager 254 controls when each Xlet is loaded, paused, and active.

Unfortunately, because of the management software requirements, programs such as the applets 112 and Xlets 256 of FIGS. 2A and 2B are not easily accessible by testing programs. In particular, these programs have their life cycles managed by the applet manager 110 or the Xlet manager 254 software via methods defined in a life cycle interface that the applications implement. However, there is no public application manager API available where the life cycle for the applets or Xlets is defined. Hence, there is no way for the testing program to request the application manager to change the state of applets or Xlets, or query the application manager for the state of applets or Xlets.

In view of the foregoing, there is a need for a testing method that is capable of testing the application management functionalities of an application manager, such as an applet manager or Xlet manager. The methods should provide a mechanism for testing software to test an application manager's ability to manage the life cycles of the programs under its control.

SUMMARY OF THE INVENTION

Broadly speaking, the present invention fills these needs by providing an application manager testing interface that provides a public API usable by testing software. The application manager testing interface allows testing software to issue commands to an application manager to test the life cycle and state management abilities of the application manager. In one embodiment, a system is disclosed for testing an application manager. The system includes a testing program capable of providing commands to test a life cycle of a dependent program controlled by an application manager. In addition, an application manager testing interface is included that is in communication with the testing program and the application manager. The application manager testing interface is capable of receiving the commands from the testing program and providing the commands to the application manager. In this manner, the application manager can control the dependent program based on the commands. In one aspect, the testing program can be controlled by the application manager. For example, the application manager can be an Xlet manager and the testing program can be an agent Xlet, or the application manager can be an applet manager and the testing program can be an agent applet. Optionally, a test harness can be included that is in communication with the testing program. In this aspect, the test harness is capable of providing test commands to the testing program. Generally, the commands provided to the application manager can request the application manager to change a state of the dependent program. Also, typically at least one command provided to the application manager can request the application manager to provide state information for the dependent program.

In an additional embodiment, a computer program embodied on a computer readable medium for facilitating testing of an application manager is disclosed. The computer program includes a code segment that receives test commands from a testing program, and a code segment that translates the test commands into corresponding application manager commands that are capable of being processed by an application manager. Further, a code segment is included that provides the application manager commands to the application manager. In this manner, the application manager can process the application manager commands. In one aspect, the application manager can be an Xlet manager, which changes the state of and/or provides state information for an Xlet in response to receiving an application manager command. In an additional aspect, the application manager can be an applet application manager, which changes the state of and/or provides state information for an applet in response to receiving an application manager command.

A method for testing an application manager is disclosed in a further embodiment of the present invention. Test commands are received to test a life cycle of a dependent program controlled by an application manager. Then, the test commands are translated into corresponding application manager test commands capable of being processed by an application manager. The application manager test commands are then provided to the application manager, which processes the application manager commands. The test commands can be received from an agent test program executed using the application manager. As above, the application manager can be, for example, an Xlet manager, and the test commands can be requests to the application manager to change a state of an Xlet. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for an application manager testing interface that provides a public API usable by testing software. The application manager testing interface allows testing software to issue commands to an application manager to test the life cycle and state management abilities of the application manager. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Embodiments of the present invention generally can be used during compatibility testing of application managers. As mentioned previously, compatibility testing refers to the methods used to test an implementation of a Java technology specification in order to assure consistency across multiple hardware platforms, operating systems, and other implementations of the same Java technology specification. When this assurance is accomplished by means of a formal process, application developers can be confident that an application will run in a consistent manner across all tested implementations of the same Java technology specification. This consistent specification-based behavior is a primary function of compatibility testing.

Currently, Java technologies can be grouped into three editions: Java 2 Standard Edition (J2SE), Java 2 Enterprise Edition (J2EE), and Java 2 Micro Edition (J2ME). As with most other types of Java software, a new Java technology should be tested to assure consistency across multiple platforms. This testing is generally performed using compatibility testing.

J2ME categorizes devices that are similar into various classes. For example, there are classes for personal digital assistances (PDAs), televisions, set-top boxes, automobiles, and other device types. Personal Basis Profile (PBP) is one of the technologies in J2ME that provides a set of Java API targeted at advanced PDAs that generally include graphics, file systems, and network connections.

Figure 1:
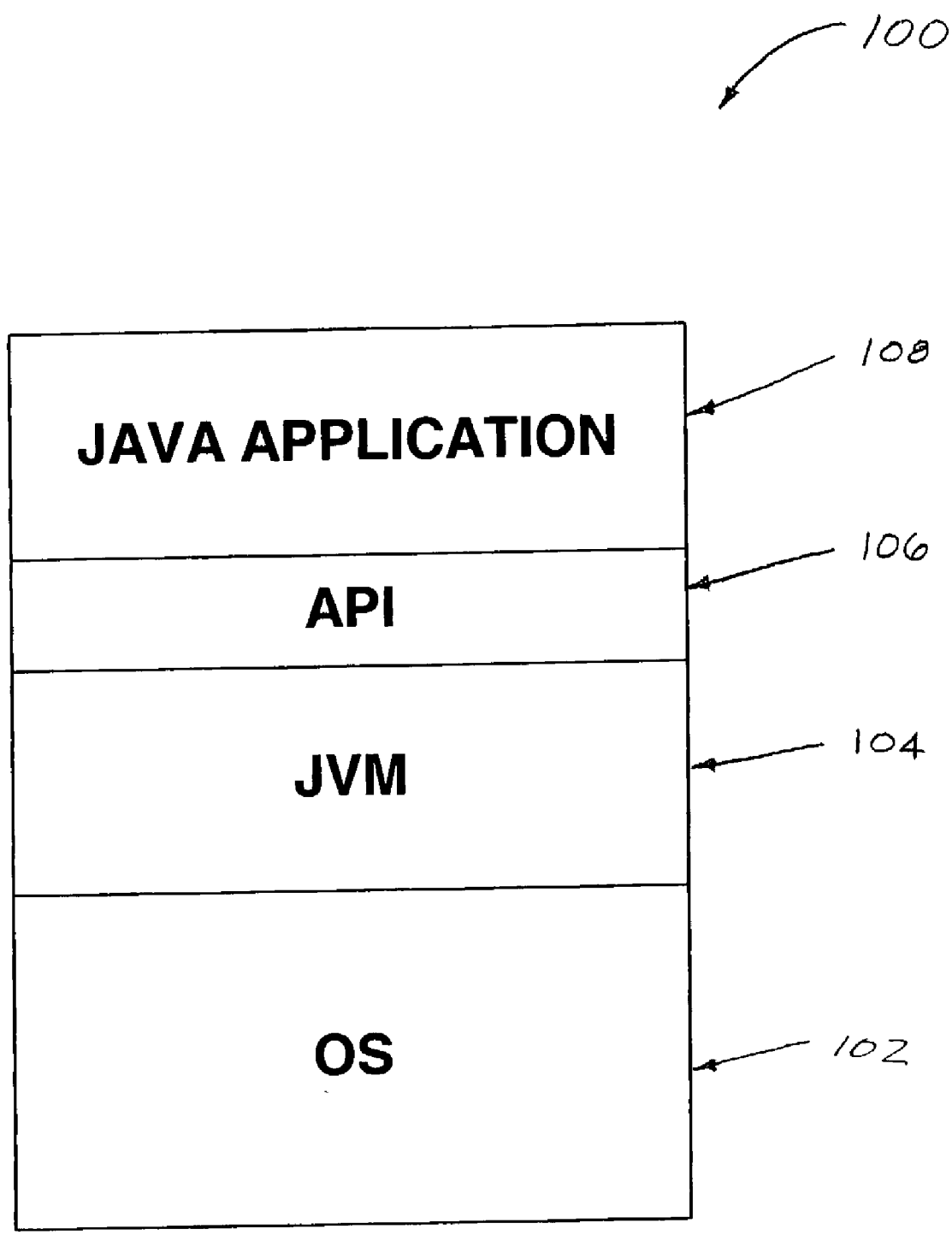
FIG. 1 is an illustration showing a conventional Java based software environment.
Figure 2B:
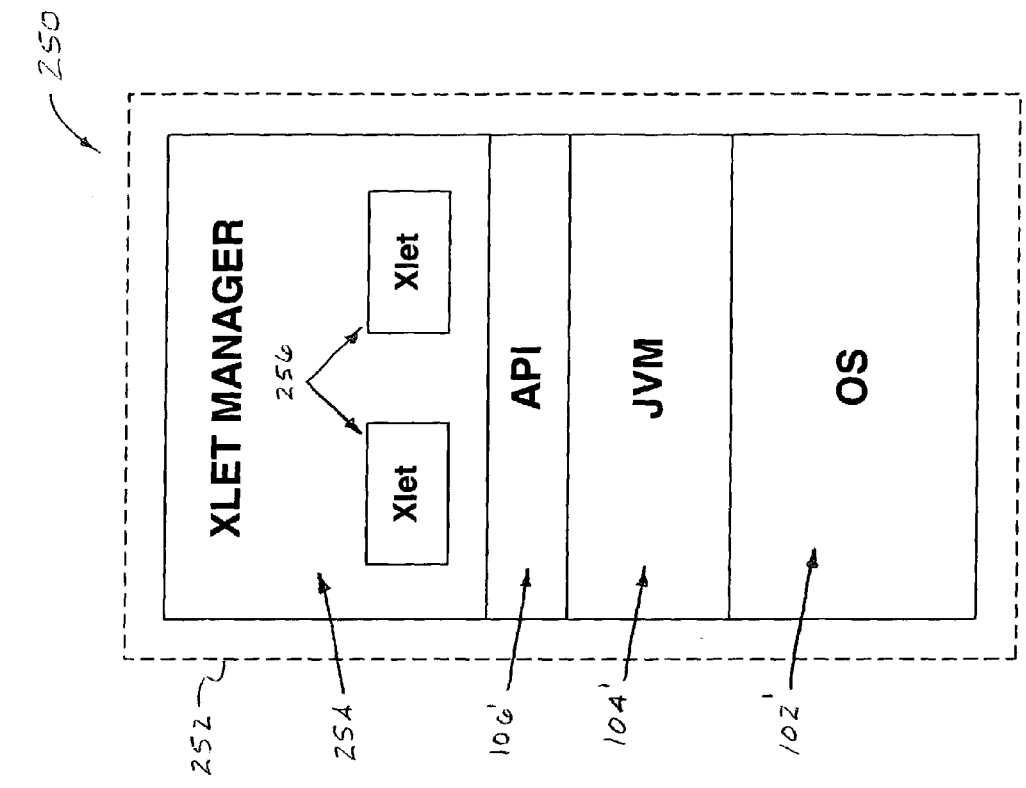
FIG. 2B is a block diagram showing a conventional J2ME Xlet based software environment.
Figure 2A:
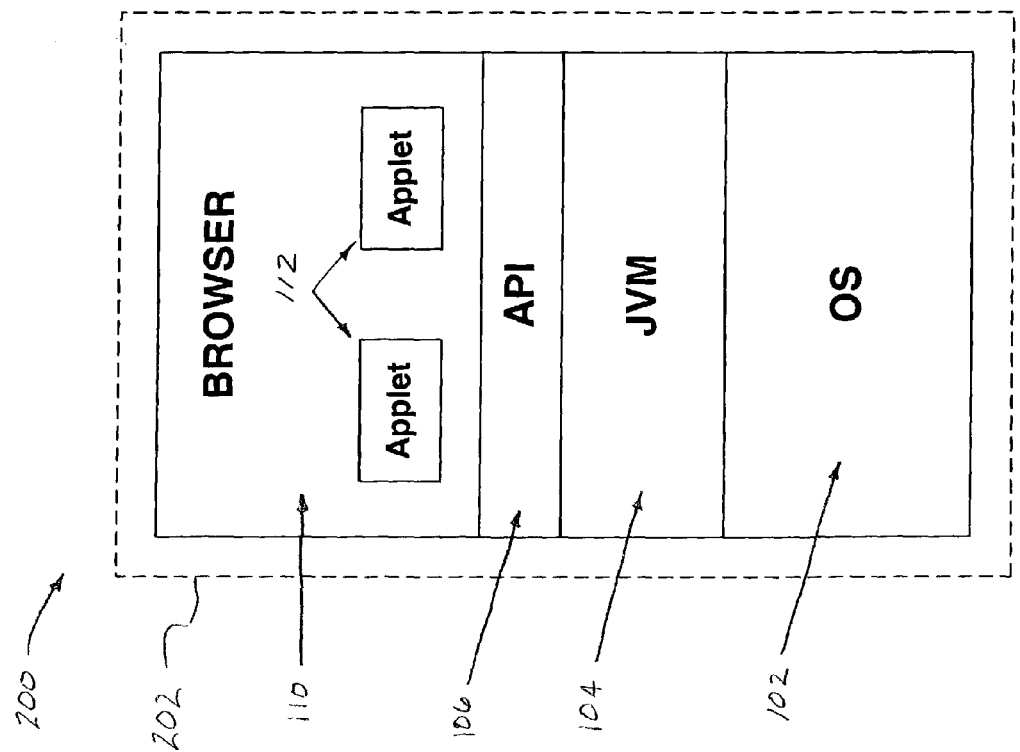
FIG. 2A is a block diagram showing a conventional Java applet based software environment.
Figure 3:
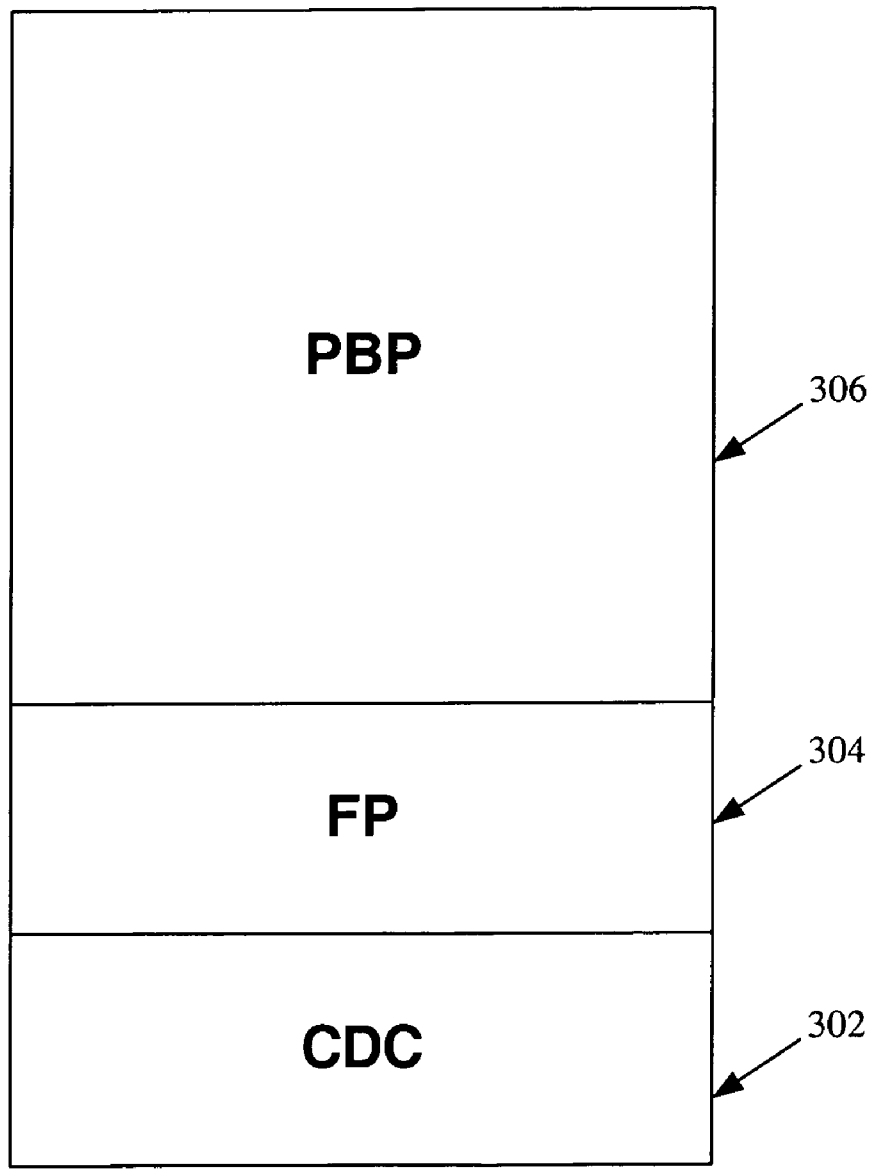
FIG. 3 is a block diagram showing a Personal Basis Profile (PBP) environment, in accordance with an embodiment of the present invention.

FIG. 3 is a block diagram showing a PBP environment 300, in accordance with an embodiment of the present invention. The PBP environment 300 provides a J2ME application environment for network-connected devices supporting a basic level of graphical presentation. In particular, the PBP environment 300 provides a standard J2ME profile for devices with relatively limited resources and basic GUI facilities. In addition, the PBP environment 300 provides a basis on which a Profile specification that supports full PersonalJava facilities can be built. Hence, the PBP environment 300 is useful in devices where a basic graphical interface is required, but a full Abstract Window Toolkit (AWT) support, which is a standard API for providing graphical user interfaces (GUIs) in Java, is inappropriate. Thus, for example, the PBP environment 300 can be used for interactive digital television, Java-based automobile services, information kiosks, and other similar devices.

As shown in FIG. 3, the PBP stack 300 includes a Connected Device Configuration (CDC) layer 302, a Foundation Profile (FP) layer 304, and a PBP layer 306. The CDC layer 302 provides a limited API and JVM for the PBP enabled device. Additional functionality, including security, is provided by the FP layer 304. And finally, graphics functionality is provided in the PBP layer 306.

As with other Java technologies, it is desirable to perform compatibility testing on the PBP layer 306. However, a PBP layer 306 specification includes the definition of Xlets and their life cycles, which maybe implemented in a PBP implementation as an Xlet manager that manages the Xlets applications. Further, the definition generally does not include a public application manager API where the life cycle for the Xlets is defined. Hence, there is no way for the testing software to access the application manager in order to test the application manager's ability to manage the life cycle of an Xlet. Embodiments of the present invention address this issue using an Xlet manager testing interface, as shown in FIG. 4.

Figure 4:
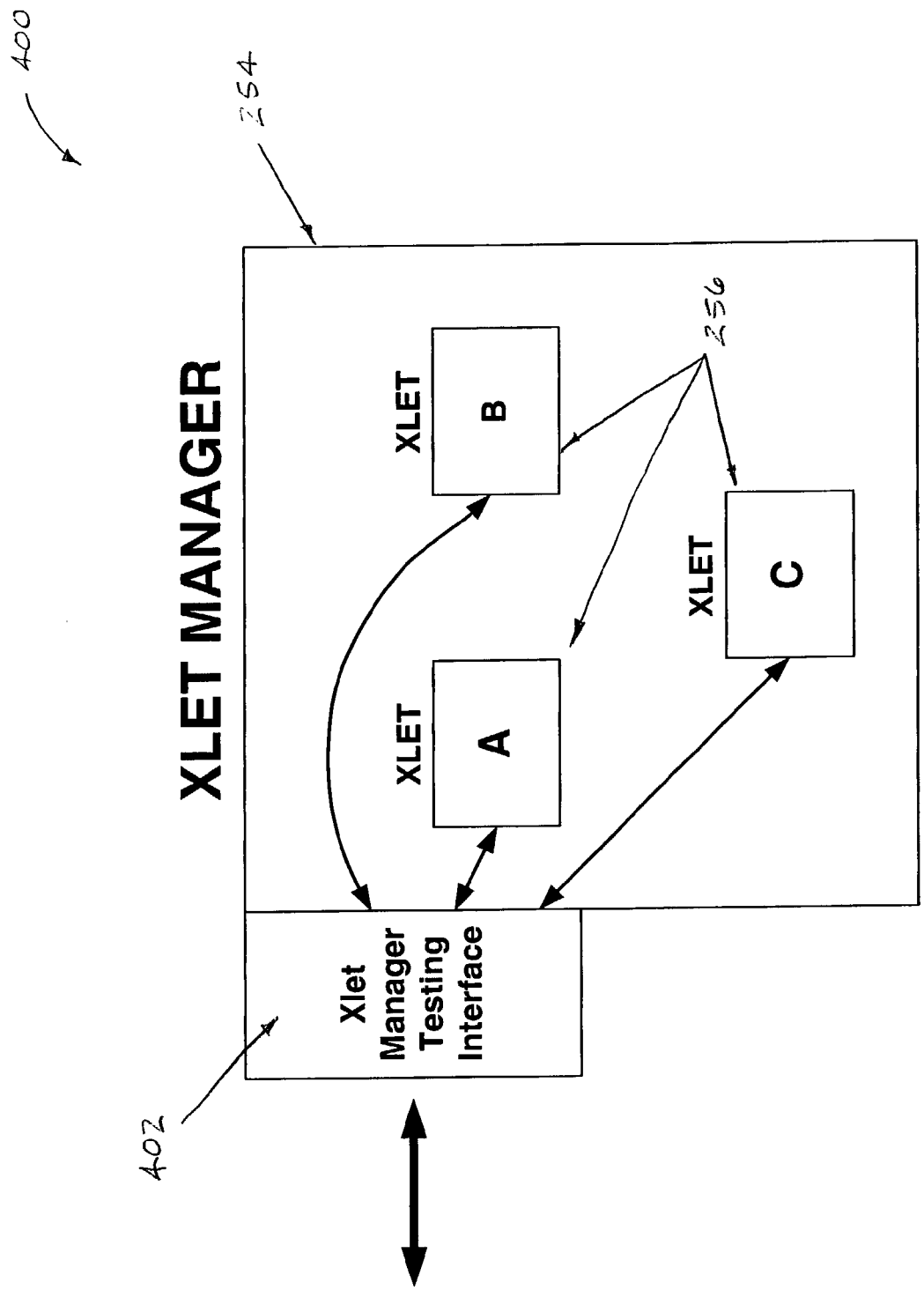
FIG. 4 is a block diagram showing a local Xlet manager testing environment, in accordance with an embodiment of the present invention.

FIG. 4 is a block diagram showing a local Xlet manager testing environment 400, in accordance with an embodiment of the present invention. The Xlet manager testing environment 400 includes an Xlet manager 254, which provides an environment for the Xlet programs 256 to execute. As mentioned above, the Xlet manager 254, controls the state and execution of the Xlets 256. Although FIGS. 4–7 will be described in terms of Xlets executing within an Xlet manager, it should be noted that the embodiments of the present invention can be used with any small program managed using an application manager, such as applets and an applet manager.

The Xlet manager testing environment 400 further includes an Xlet manager testing interface 402, which provides a public API that allows testing software to test the Xlet manager's 254 ability to manage the life cycles of the Xlets 256 under its control. In this manner, a testing program can use the Xlet manager testing interface 402 to initiate prescribed application behavior in the implementation under test in order to test the results. For example, the Xlet manager testing interface 402 allows a test program to instruct the Xlet manager 254 to load an Xlet 256 dynamically at runtime. In addition, Xlet manager testing interface 402 allows a test program to request the Xlet manager 254 to change the state in the life cycle of an Xlet 256, as shown in FIG. 5.

Figure 5:
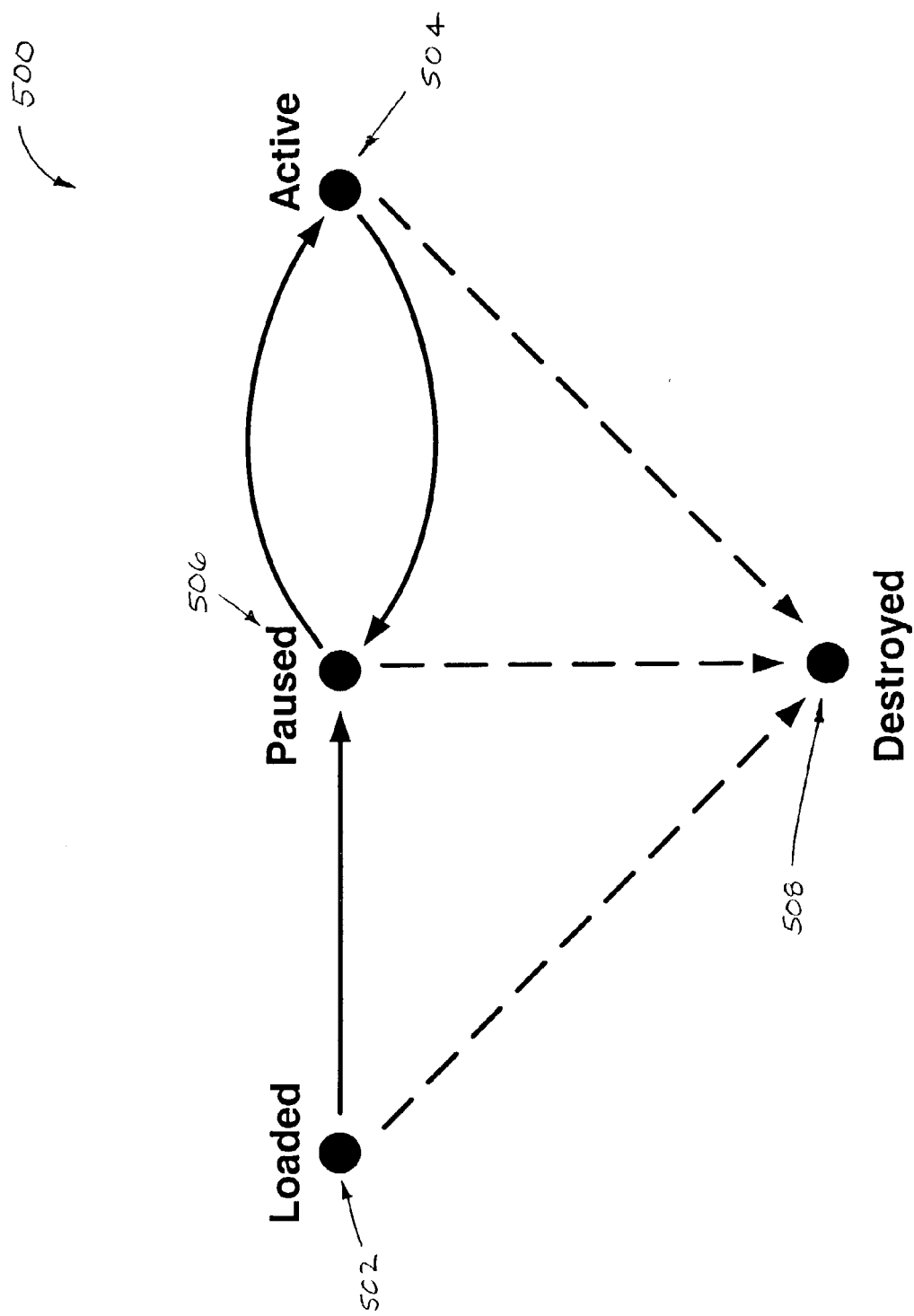
FIG. 5 is a state diagram showing exemplary states of a small application, such as an Xlet or applet.

FIG. 5 is a state diagram showing exemplary states 500 of a small application, such as an Xlet or applet. As shown in FIG. 5, a particular Xlet, at any given time, can be in a loaded state 502, a paused state 506, an active state 504, or a destroyed state 508. For example, when the Xlet manager first receives a request related to a particular Xlet, the Xlet manager may load the Xlet into memory, thus placing the Xlet into the loaded state 502. Normally, from loaded state, the Xlet can enter paused state after it is initialized by the Xlet manager. Then from paused state, the Xlet can enter active state after it is started by the Xlet manager. When the Xlet is in the active state 504, the Xlet is executing within the Xlet manager environment. In addition, Xlet manager may place the Xlet in a paused state 506, wherein the execution of the Xlet is suspended. A paused Xlet can be started again, thus placing the Xlet back to the active state 504. An Xlet may transition between the active state 504 and paused state 506 any number of times during the life cycle of the Xlet. In addition, an Xlet may move to a destroyed state 508, wherein the Xlet has released all of its resources and terminated. An Xlet can move to the destroyed from any other state, as shown in FIG. 5.

Referring back to FIG. 4, the Xlet manager testing interface 402 further allows a test program to monitor the state of each Xlet 256 under the control of the Xlet manager 254. Generally, the Xlet manager 254 tracks the state of each Xlet 256 under its control. The Xlet manager testing interface 402 allows a test program to query the Xlet manager 254 for the state of particular Xlets 256. In this manner, embodiments of the present invention provide a mechanism for testing the life cycle of small programs designed to execute in conjunction with an application manager, such as applet managers and Xlet managers.

Figure 6:
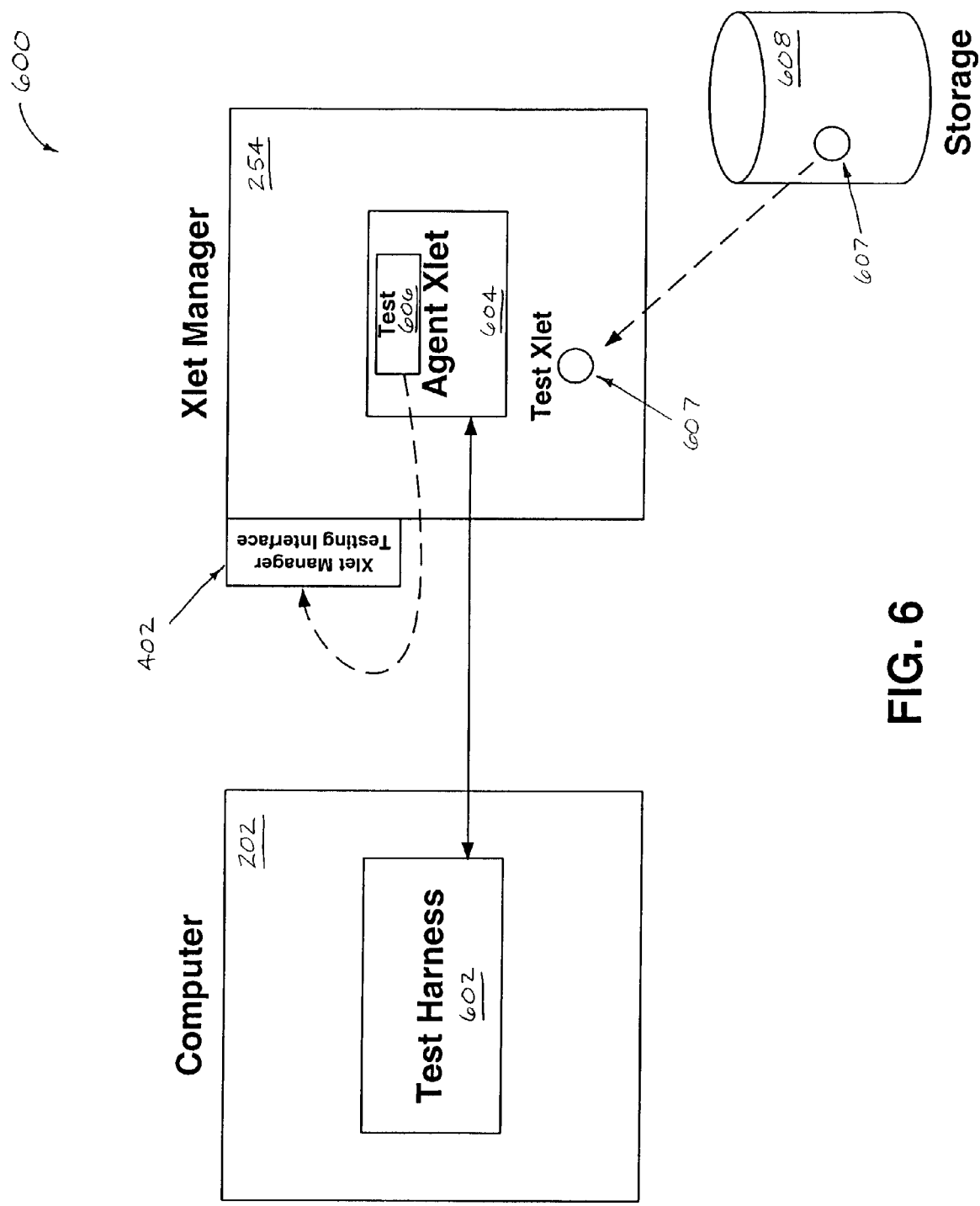
FIG. 6 is a system diagram showing an Xlet life cycle testing system, in accordance with an embodiment of the present invention.

FIG. 6 is a system diagram showing an Xlet life cycle testing system 600, in accordance with an embodiment of the present invention. To test an application manager, it is often advantageous to utilize a separate computer to manage the test. Thus, the Xlet life cycle testing system 600 includes a testing computer 202, which executes a test harness 602. The test harness 602 controls the flow of the Xlet manager test, for example, by executing a test suite, obtaining test results, and storing the test results in appropriate directories.

During a test, an agent Xlet 604 is executed in the Xlet manager 254 under test. In addition, the agent Xlet 604 is placed in communication with the test harness 604. In operation, the agent Xlet 604 receives test commands from the test harness 602, and executes the test commands locally using the Xlet manager testing interface 402. For example, to test the Xlet manager's ability to successfully load an Xlet, the test harness may include a test 606 that loads a test Xlet 607 from computer storage 608. In this case, the test harness 602 sends a command to the agent Xlet 604, which instructs the agent Xlet 604 to load and execute test 606, which in turn loads the test Xlet 607 from the computer storage 608. When test 606 starts executing, it sends a command to the Xlet manager 254 by calling a function defined in Xlet manager testing interface 402, to load the test Xlet 607.

Once the Xlet manager receives the load command from the Xlet manager 254 testing interface 402, the Xlet manager 254 performs the load operation, and loads the test Xlet 607. To test the Xlet manager's 254 ability to change the state of an Xlet, the test 606 further requests the Xlet manager 254, for example, to destroy the Xlet 607 it just loads. To do that, test 606 can send a command, via the Xlet manager testing interface, to the Xlet manager 254 to destroy the test Xlet 607. Upon receiving the destroy command from the Xlet manager testing interface 402, the Xlet manager 254 calls the life cycle method for destroying an Xlet in test Xlet 607 and changes the state of the test Xlet 607 to a destroyed state. In addition, the test 606 can verify that the Xlet manager 254 correctly performs instructions by querying the state of Xlets using the Xlet manager testing interface 402.

Thus, the Xlet manager testing interface 402 can be used during compatibility testing of application managers. As mentioned previously, compatibility testing refers to the methods used to test an implementation of a Java technology specification in order to assure consistency across multiple hardware platforms, operating systems, and other implementations of the same Java technology specification. When this assurance is accomplished by means of a formal process, application developers can be confident that an application will run in a consistent manner across all tested implementations of the same Java technology specification. In particular, embodiments of the present invention can be used to test a PBP implementation using a PBP technology compatibility kit (TCK) if the Xlet manager testing interface is implemented in the PBP implementation under test. In the present disclosure references to application manager testing interface refer to a testing interface for testing application managers for small programs. Hence, an application manager testing interface can be an Xlet manager testing interface, as described with reference to FIGS. 4 and 6, an applet manager testing interface for testing applet managers, or any similar type of program.

The PBP TCK is a portable, configurable and automated test suite for verifying the compliance of an implementation of a PBP Specification. Each application manager that actually controls the Xlet life cycle is implementation specific. The PBP TCK uses an agent Xlet and an Xlet manager testing interface to test an implementation's Xlet life cycle behavior for adherence to the specification. In this manner, the PBP TCK can programmatically communicate with the application manager of the device under test using the Xlet manager testing interface.

In one embodiment, the Xlet manager testing interface is specified by these two interfaces, namely, an XletManager.java interface and a ManageableXlet.java interface. The XletManager.java interface defines a mechanism for an application to introduce and load Xlets into the system, after which further life cycle control is handled by the implementation of the ManageableXlet interface. Once the system is aware of an Xlet, the ManageableXlet interface controls the life cycle of an Xlet by triggering state changes and querying for the state of an Xlet.

Following is a list of illustrated source files corresponding to the XletManager.Java interface and the ManageableXlet.java interface.

```
    XletManager.java:
/*
 * 1.3 @(#)XletManager.java1.3:
 *
 */
package com.sun.tck.pbp.xlet;
/**
 * This interface defines a way for an application to introduce xlets
 * into the system. The further control of an xlet is performed via
 * the ManageableXlet interface.
 *
 * Developers should supply the name of the implementation class
 * and its arguments to the AgentXlet. The format is
 * "-xletManager <class name> [arguments]".
 * The no-argument constructor will be called to instantiate
 * the specified class, immediately followed by a call to
 * init(String[ ] args) to initialize the instance with
 * the specified arguments (if any).
 */
public interface XletManager {
/**
 * Request the Xlet manager to load an xlet.
 * The xlet will be in the loaded state once this method returns
 * successfully.
 *
 * @param className class name of the xlet
 * @param location location of the xlet classes
 * @param args initialization arguments for the xlet
 * @return an instance of ManageableXlet, which can be used to
 * trigger xlet state changes, or null if the constructor
 * of the Xlet did not return successfully.
 *
 * @throws ClassNotFoundException if className cannot be found
 * in the given location
 *
```

```
-continued

*/
public ManageableXlet loadXlet(String className, String location,
  String[ ] args)
  throws ClassNotFoundException;
/**
 * Initialize the Xlet manager. This method will be called
 * immediately after the no-argument constructor is called.
 *
 * @param args Arguments used in initializing the Xlet manager.
 */
public void init(String[ ] args);
}
```

Initialization Arguments: Within the interface definition, arguments can be passed to the implementation class of XletManager when it is initialized. The arguments are passed to the init (String[ ] args) method. Place the arguments after the implementation class specification at the command line in this format:

-xletManager implementation_class_name [arguments_if_any]

Note that the following command line options are reserved by the JavaTest agent and should not be used as arguments for XletManager:

-help
-usage
-active
-activeHost
-activePort
-passive
-passivePort
-serialPort
-map
-concurrency
-trace
-observer It should be noted that the implementation of the Xlet manager class for the PBP reference implementation does not require any arguments.

```
ManageableXlet.java:
/*
 * 1.1 @(#)ManageableXlet.java1.1
 *
 */
package com.sun.tck.pbp.xlet;
/**
 * This interface defines methods that trigger state changes
 * and query for the state of an xlet. The state change trigger
 * methods should be called from the same thread to guarantee
 * the correct sequence of state changes.
 */
public interface ManageableXlet {
/**
 * Request the Xlet to enter PAUSED state from LOADED state.
 * It should be silently ignored if the Xlet is not in LOADED state at the
 * time of the request, otherwise the Xlet's initXlet( ) method should
 * be invoked.
 *
 * Note that the state of the Xlet may not yet be changed when this
 method
 * returns, i.e., the method may return to the caller before completing
 * the work.
 *
 */
public void initXlet( );
```

-continued

```
/**
 * Request the Xlet to enter ACTIVE state from PAUSED state.
 * It should be silently ignored if the Xlet is not in PAUSED state at the
 * time of the request, otherwise the Xlet's startXlet( ) method should
 * be invoked.
 *
 * Note that the state of the xlet may not yet be changed when this method
 * returns, i.e., the method may return to the caller before completing
 * the work.
 *
 */
public void startXlet( );
/**
 * Request the Xlet to enter PAUSED state from ACTIVE state.
 * It should be silently ignored if the Xlet is not in ACTIVE state at the
 * time of the request, otherwise the Xlet's pauseXlet( ) method should
 * be invoked.
 *
 * Note that the state of the xlet may not yet be changed when this method
 * returns, i.e., the method may return to the caller before completing
 * the work.
 *
 */
public void pauseXlet( );
/**
 * Request the Xlet to enter DESTROYED state and invoke the Xlet's
 * destroyXlet(unconditional) method.
 *
 * Note that the state of the xlet may not yet be changed when this method
 * returns, i.e., the method may return to the caller before completing
 * the work.
 *
 */
public void destroyXlet(boolean unconditional);
/**
 * Get the state of the xlet.
 *
 * @return state of the Xlet, which should be one of
 * LOADED, ACTIVE, PAUSED, DESTROYED or UNKNOWN
 */
public int getState( );
/**
 * Xlet is not loaded, or its state information
 * can not be found by the Xlet manager. This may happen
 * if the Xlet has been destroyed and the Xlet
 * manager does not keep its reference.
 */
public static final int UNKNOWN = 0;
/**
 * Xlet is loaded by calling its
 * no-argument constructor.
 */
public static final int LOADED = 1;
/**
 * Xlet is paused
 */
public static final int PAUSED = 2;
/**
 * Xlet is active
 */
public static final int ACTIVE = 3;
/**
 * Xlet is destroyed
 */
public static final int DESTROYED = 4;
}
```

In the PBP TCK, Xlet manager testing is enabled by specifying the implementation class of Xlet manager testing interface as an argument to the agent Xlet using -xletManager option, followed by any other initialization arguments. For example, com.sun.tck.pbp.xlet.ri.XletManagerImpl1 is the implementation class of Xlet manager testing interface for Sun's PBP reference implementation. In this case, it can be specified in the startup command line for the agent Xlet as follows (no other arguments are required by this implementation):

-xletManager com.sun.tck.pbp.xlet.ri.XletManagerImpl1

For other PBP implementations, use the applicable implementation of the Xlet manager testing interface for startup instead of the com.sun.tck.pbp.xlet.ri.XletManagerImpl1 class, followed by initialization arguments if any:

-xletManager implementation_class_name [arguments_if_any]

Figure 7:
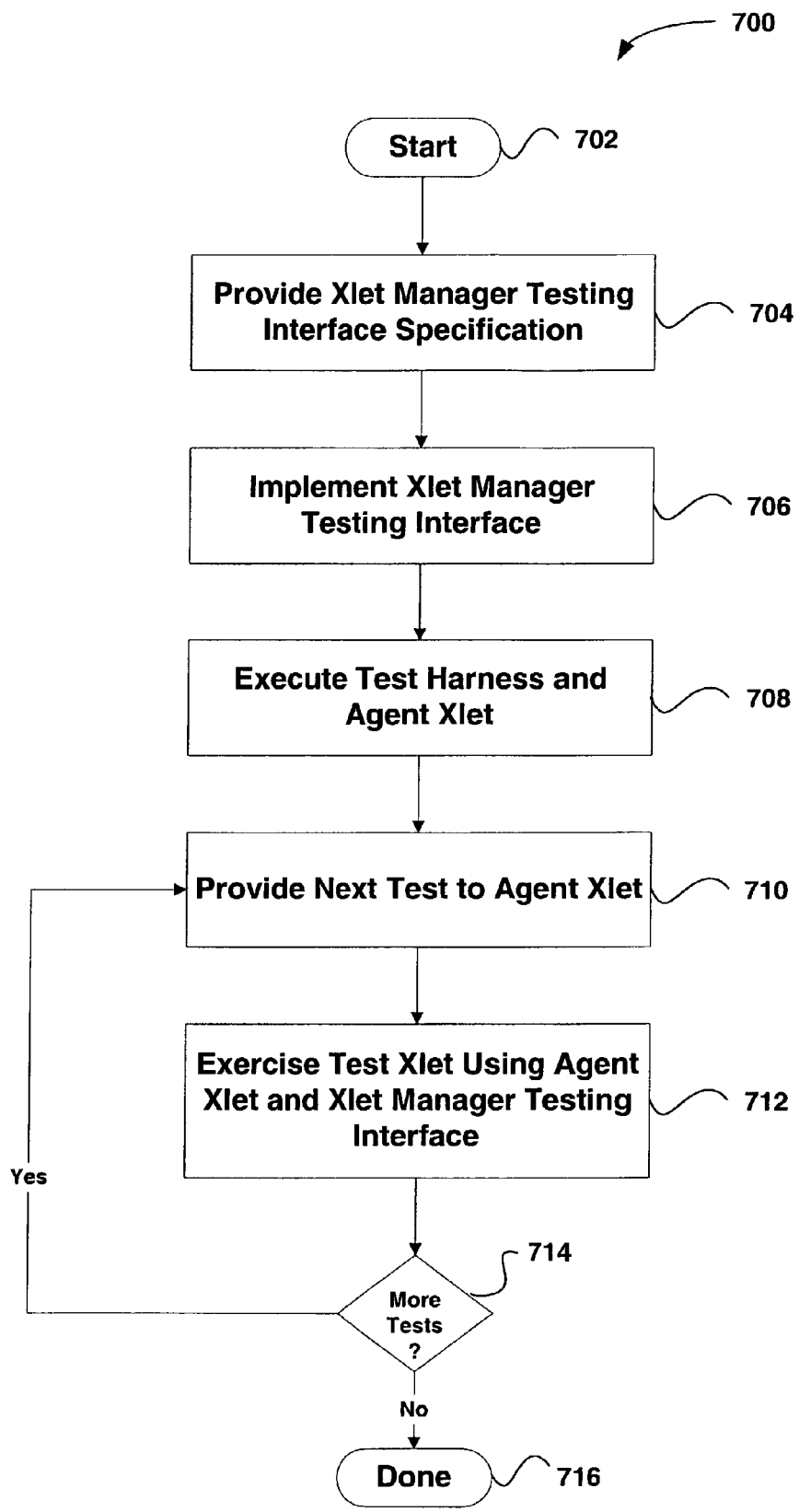
FIG. 7 is a flowchart showing a method for Xlet and applet manager testing, in accordance with an embodiment of the present invention.

FIG. 7 is a flowchart showing a method 700 for Xlet and applet manager testing, in accordance with an embodiment of the present invention. In an initial operation 702, preprocess operations are performed. Preprocess operations can include implementing a specific application manager, developing small programs, such as Xlets to execute within the application manager, and other preprocess operations that will be apparent to those skilled in the art after a careful reading of the present disclosure.

In operation 704, an Xlet manager testing interface specification is provided. As mentioned above, a typical implementation of an application manager program, such as a PBP Xlet manager, does not include a mechanism for external software to manipulate the life cycles of the Xlets under the application manager's control. Hence, the embodiments of the present invention address this issue by providing an Xlet manager testing interface specification for allowing external software to manipulate the life cycles of the Xlets under the application manager's control.

Then, in operation 706, the Xlet manager testing interface is implemented. In one embodiment, the Xlet manager interface provides a standard public API usable by test software. Thus, a user can implement the Xlet manager interface API by incorporating the actual Xlet life cycle method and function calls of the particular application manager into the API implementation. In one embodiment, the developer of application manager of the implementation under test is expected to implement the Xlet manager testing interface API. Since the developer knows the internal architecture of their application manager, the developer has knowledge of the internal methods and functions of the application manager that control Xlet life cycle. Hence, to implement the Xlet manager testing interface, the developer incorporates this methods and functions into the Xlet manager testing interface API implementation.

Once the Xlet manager testing interface is implemented, a test harness and agent Xlet are executed, in operation 708. As mentioned above, the test harness controls the flow of the Xlet manager test, for example, by executing a test suite, obtaining test results, and storing the test results in appropriate directories. The agent Xlet is executed using the Xlet manager to be tested. In addition, the agent Xlet is placed in communication with the test harness.

In operation 710, the next test in the test suite is provided to the agent Xlet. As discussed previously, the agent Xlet receives test commands from the test harness, and executes the test commands locally by executing a test which uses the Xlet manager testing interface. For example, to test the Xlet manager's ability to successfully load an Xlet, the test suite may include a test that loads a test Xlet from computer storage. In this case, the test harness sends a command to the agent Xlet, which instructs the agent Xlet to load and execute the test that in turn loads the test Xlet, from the computer storage. To do that, the test sends a command to the Xlet manager via the Xlet manager testing interface, to load the test Xlet. Once the Xlet manager receives the load command from the Xlet manager testing interface, the Xlet manager performs the load operation, and loads the test Xlet.

As mentioned previously, the Xlet manager testing interface allows a test to load, change the state, and obtain the state status of Xlets under the Xlet manager's control. For example, the test can send a command, via the Xlet manager testing interface, to the Xlet manager to destroy the test Xlet just loaded. Upon receiving the destroy command from the Xlet manager testing interface, the Xlet manager changes the state of the test Xlet to a destroyed state. In addition, the test can verify that the Xlet manager correctly performs instructions by querying the state of Xlets using the Xlet manager testing interface.

A decision is then made as to whether additional tests remain, in operation 714. If additional tests remain to be executed, the method 700 proceeds to another agent Xlet test load operation 710. Otherwise, the method 700 completes in operation 716, where post process operations are performed. Post process operations can include loading additional tests suites, terminating the agent Xlet, and other post process operations that will be apparent to those skilled in the art after a careful reading of the present disclosure.

Embodiments of the present invention may be practiced with various computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for testing an application manager, comprising:
    a first computer executing a testing program providing non-API, life-cycle commands to test a life cycle of a dependent program controlled by an application manager; an application manager testing interface in communication with the testing program and the application manager, the application manager testing interface receiving the non-API, life-cycle commands from the testing program and delegating the non-API, life-cycle commands to the application manager, wherein the application manager controls the dependent program based on the non-API, life-cycle commands.

2. A system as recited in claim 1, wherein the testing program is controlled by the application manager.

3. A system as recited in claim 2, wherein the application manager is an Xlet manager.

4. A system as recited in claim 3, wherein the testing program is an agent Xlet.

5. A system as recited in claim 2, wherein the application manager is an applet manager.

6. A system as recited in claim 5, wherein the testing program is an agent applet.

7. A system as recited in claim 1, further comprising a second computer executing a test harness in communication with the testing program, the test harness providing test non-API, life-cycle commands to the testing program.

8. A system as recited in 1, wherein the commands provided to the application manager request the application manager to change a state of the dependent program.

9. A system as recited in claim 1, wherein at least one non-API life-cycle command provided to the application manager requests the application manager to provide state information for the dependent program.

10. A computer program embodied on a computer readable medium, the computer program facilitating testing of an application manager, comprising:
    a code segment that receives test non-API, life-cycle commands from a testing program;
    a code segment that translates the non-API, life-cycle test commands into corresponding application manager commands being processed by an application manager; and
    a code segment that provides the application manager commands to the application manager, wherein the application manager processes the application manager commands to test the application manager.

11. A computer program as recited in claim 10, wherein the application manager is an Xlet manager.

12. A computer program as recited in claim 11, wherein the application manager changes a state of an Xlet in response to receiving an application manager command.

13. A computer program as recited in claim 11, wherein the application manager provides state information for an Xlet in response to receiving an application manager command.

14. A computer program as recited in claim 10, wherein the application manager is an applet application manager.

15. A computer program as recited in claim 14, wherein the application manager changes the state of an applet in response to receiving an application manager command.

16. A computer program as recited in claim 14, wherein the application manager provides state information for an applet in response to receiving an application manager command.

17. A method for testing an application manager, comprising the operations of:
receiving non-API, life-cycle test commands to test a life cycle of a dependent program controlled by an application manager;
translating the non-API, life-cycle test commands into corresponding application manager test commands being processed by an application manager; and
providing the application manager test commands to the application manager, wherein the application manager processes the application manager commands to test the life cycle of the dependent program.

18. A method as recited in claim 17, wherein the non-API, life-cycle test commands are received from an agent test program executed using the application manager.

19. A method as recited in claim 18, wherein the application manager is an Xlet manager, and wherein the non-API, life-cycle test commands request the application manager to change a state of an Xlet.

20. A method as recited in claim 18, wherein the application manager is an applet application manager, and wherein the application manager changes a state of an applet in response to receiving an application manager command.

* * * * *